United States Patent [19]

Yoshimura

[11] Patent Number: 4,772,944

[45] Date of Patent: Sep. 20, 1988

[54] STEREOSCOPIC IMAGE SIGNAL PROCESSING DEVICE

[75] Inventor: Katsuji Yoshimura, Kanagawa, Japan

[73] Assignee: Canon Kabushiki Kaisha, Tokyo, Japan

[21] Appl. No.: 73,806

[22] Filed: Jul. 15, 1987

[30] Foreign Application Priority Data

Jul. 25, 1986 [JP] Japan .................................. 61-173803

[51] Int. Cl.⁴ ...................... H04N 13/02; H04N 13/04
[52] U.S. Cl. .......................................... 358/92; 358/88
[58] Field of Search .................... 358/92, 88, 91, 89, 358/3

[56] References Cited

U.S. PATENT DOCUMENTS 4,214,267 7/1980 Roese et al. ...................... 358/92 X
4,286,286 8/1981 Jurisson et al. ........................ 358/92
4,562,463 12/1985 Lipton ............................... 358/92 X Primary Examiner—Howard W. Britton
Assistant Examiner—Victor R. Kostak
Attorney, Agent, or Firm—Robin, Blecker & Daley

[57] ABSTRACT

A stereoscopic image signal processing device provides that, while a stereoscopic image signal in the form of a plurality of types of time-divisionally multiplexed image information signals is input thereto, a prescribed one of the plurality of types of image information signals is sampled from the input stereoscopic image signal by detecting the time of changeover between any two types of all the image information signals, and is memorized so that, by using the memorized image information signal, only the prescribed type of image information signal is output.

8 Claims, 4 Drawing Sheets

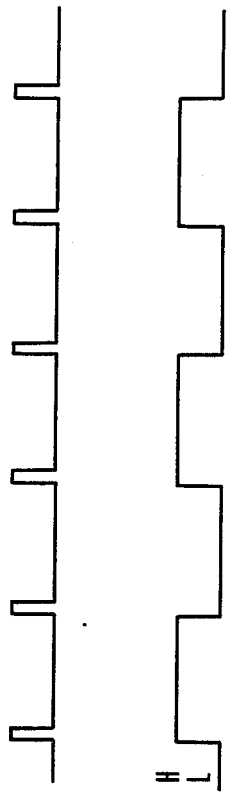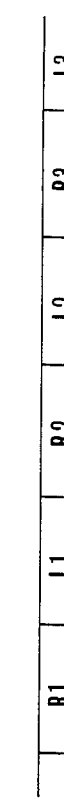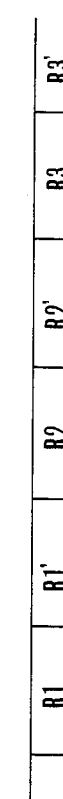

STEREOSCOPIC IMAGE SIGNAL PROCESSING DEVICE

BACKGROUND OF THE INVENTION

1. Field of the Invention

This invention relates to a stereoscopic image signal processing device for processing stereoscopic image signals.

2. Description of the Related Art

FIG. 1 illustrates the main parts of a stereoscopic television apparatus which has been considered in the past. In the figure, 1R and 1L are respectively television cameras for shooting a scene at one time to produce video signals. The right-camera-eye image information signal is obtained from the television camera 1R, and the left-camera-eye one from the other camera 1L. An output selector circuit 2 is receptive of the above-described right- and left-camera-eye image information signals from the television cameras 1R and 1L and puts them on its output line alternately in synchronized relation to a synchronizing signal of 60 Hz from a synchronizing signal generator circuit 3. The stereoscopic image signal produced from the output selector circuit 2 is amplified by an amplifier 4. A television set 5 of, for example, NTSC system receives the output of the amplifier 4 and reproduces images for a stereoscopic picture. In this case, the right-camera-eye image appears in the odd-numbered field of a picture frame on the television set 5, and the left-camera-eye image appear in the even-numbered field of the picture frame. A synchronizing signal separation circuit 6 separates out the vertical synchronizing signal (60 Hz) from the stereoscopic image signal produced from the amplifier 4 to produce a pulse signal of 60 Hz. Light-shutters 7R and 7L are mounted on the right and left sides of the rim of a pair of viewing spectacles 8 for the stereoscopic picture. A shutter drive circuit 9 operates in such a manner that the right light shutter 7R is opened, while the left light shutter 7L is closed, in synchronism with the synchronizing signal produced from the synchronizing signal separation circuit 6 when the left-camera-eye image of the picture frame is reproduced on the display surface of the television set 5, and the light shutters 7R and 7L are closed and opened respectively, when the right-camera-eye image is reproduced.

In operating the prior known stereoscopic television apparatus of such a constructional feature, when a scene, for example, as shown in FIG. 2, a car C moving across the front of a tree T (background) from right to left, is shot by the television cameras 1R and 1L at one time, their video signals alternately go out from the output selector circuit 2 in synchronism with the output of the synchronizing signal generator circuit 3, and the sequence of the right- and left-camera-eye image signals alternating with each other is applied through the amplifier 4 to the television set 5. Thus, the right-and left-camera-eye images are presented in, for example, the even- and odd-numbered fields of a frame on the television set 5 respectively. An example of the reproduced stereoscopic picture is shown in FIG. 3.

When the right- and left-camera-eye images on the display surface of the television set 5 are viewed through the pair of spectacles 8 whose light-shutters 7R and 7L are alternately driven to open and close by the shutter drive circuit 9 (see FIG. 4), light radiating from the right-camera-eye image, for example, indicated at 4a in FIG. 3, passes through the opened light-shutter 7L to the left eye El of an observer P, while light radiating from the left-camera-eye image 4b passes through the opened light shutter 7R to the right eye Er of the observer P. Hence, that image of the car C in the left eye El which lies on the right side of the image of the tree T and that image of the same car C in the right eye Er which lies on the left side of the image of the tree T are superimposed by the afterimage effect so that, as shown in FIG. 5, the observer P perceives the scene stereoscopically as if the image of the car C were nearer to him than the tree T. The larger the visual difference of the right and left eyes, the longer the distance between the car and tree in the stereoscopic picture can be perceived.

The conventional stereoscopic television apparatus could work well only when the viewer wore the light-shutter spectacles. If he took off his stereoscopic spectacles and viewed directly its television set to get the surface image as in the ordinary television set, a problem arose that, because its feature is to alternately reproduce the right and left images in the same display surface of the television set, they were seen as superimposed one upon another. Thus, what was not stereoscopic, or as in the ordinary television set, could not be seen.

SUMMARY OF THE INVENTION

An object of the invention is to eliminate the above-described problem.

Another object is to make it possible that by using a simple means, even though the stereoscopic image signal is supplied, a picture which is not stereoscopic is observed by extracting only one type of image information signal out of a plurality of types of image information signal constituting the stereoscopic image signal.

Under such objects, according to the present invention, as an embodiment thereof applied to the stereoscopic image signal processing device for processing a stereoscopic image signal which is in the form of a plurality of type of time-divisionally multiplexed image information signals, provision is made of:

changeover timing detection means receptive of the aforesaid stereoscopic image signal for detecting the timing of changing over between any types of the time-divisionally multiplexed image information signals in the output stereoscopic image signal;

memory means for memorizing a prescribed one of the aforesaid plurality of types of image information signals;

control means responsive to the changeover timing of each types of image information signal detected by the changeover timing detection means for controlling the writing-in and reading-out operation of the memory means; and output means responsive to changeover timing of each type of image information signal detected by the changeover timing detection means for producing only the prescribed type of image information signal.

Still another object of the invention resides in the realization of introduction of a capability that when shooting an object to be observed, not only the stereoscopic image signal of the object is formed and output, but also an image signal of the same object which is not stereoscopic, but flat as usual, is formed and output without involving an unduly large increase in the structure.

Under such an object, according to the present invention, as an embodiment thereof applied to the stereoscopic image signal processing device for processing a stereoscopic image signal, provision is made of:

image pickup means receptive of first and second different images of an object for producing their signals alternately in prescribed periods to form a stereoscopic image signal;

changeover timing detection means for detecting the timing of changing over between the first and second object image signals in the stereoscopic image signal produced from the image pickup means;

memory means for memorizing the first object image signal out of the first and second object image signals;

control means responsive to the changeover timing of the first and second object image signals detected by the changeover timing detection means for controlling the writing-in and reading-out operation of the memory means;

indicating means having a first output mode in which the stereoscopic image signal is output, and a second output mode in which only the first object image signal is output and a function of selectively indicating either one of the output modes; and output means operating in such a manner that when the first output mode is indicated in the indicating means, the stereoscopic image signal obtained from the image pickup means is output, and when the second output mode isindicated, the output from the image pickup means and the output from the memory means are alternately selected in response to the changeover timing of the first and second object image signals detected by the changeover timing detection means so that the first object image signal only is output.

Other objects and features of the invention than those described above will become apparent from the following detailed description of embodiments thereof by reference to the accompanying drawings.

BRIEF DESCRIPTION OF THE DRAWING

FIG. 7(a) to FIG. 7(f) comprise a timing chart of pulses at the various points in the circuit of FIG. 6.

DESCRIPTION OF THE PREFERRED EMBODIMENTS

The invention is next described in connection with an embodiment thereof.

Figure 1:
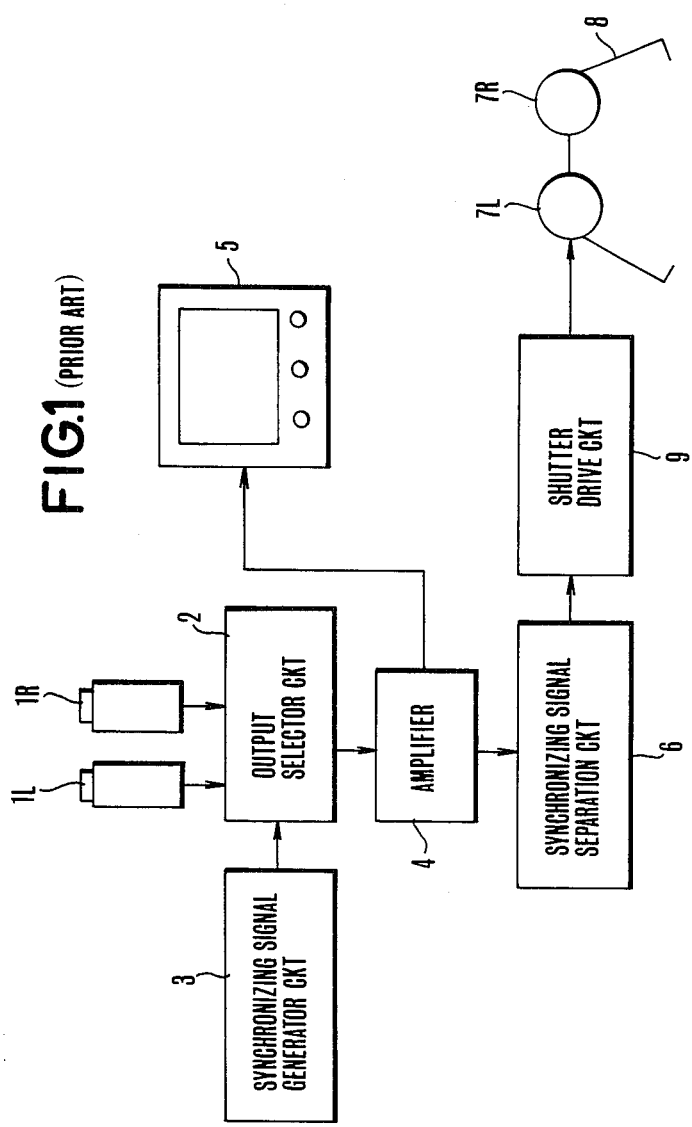
FIG. 1 is a diagram illustrating the main parts of a conventional example of the stereoscopic television apparatus.
Figure 2:
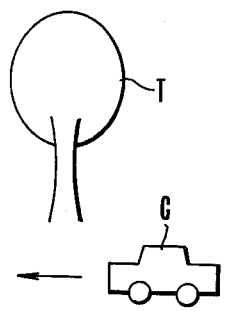
FIG. 2 is a view illustrating a scene to be shot.
Figure 3:
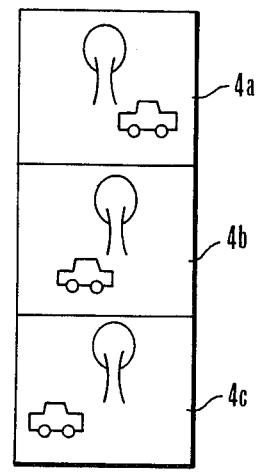
FIG. 3 is a pictorial representations of the images of the scene of FIG. 2.
Figure 4:
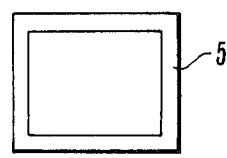
FIG. 4 and FIG. 5 explain stereoscopic vision.
Figure 4:
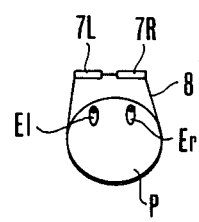
Figure 5:
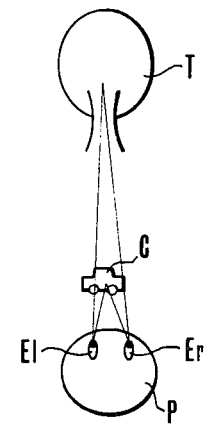
Figure 6:
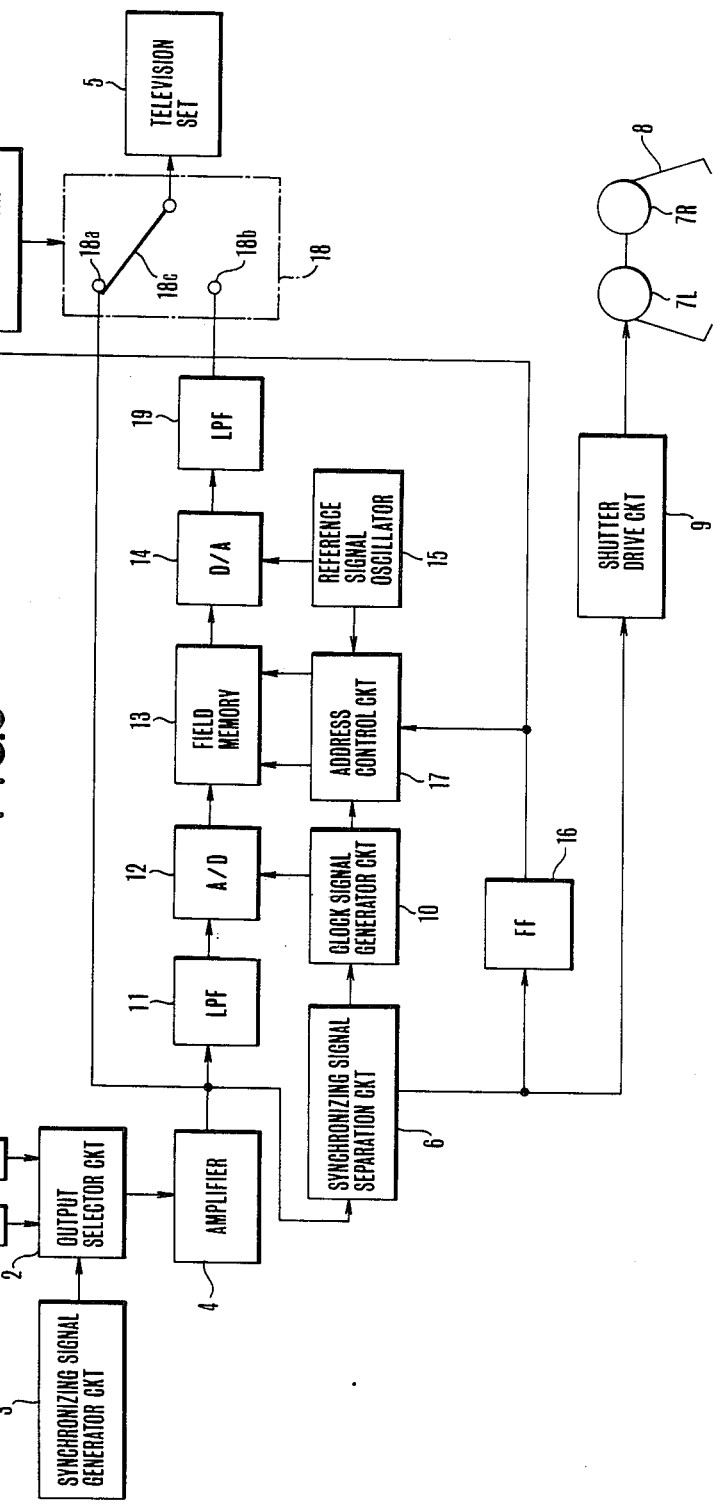
FIG. 6 is a diagram of an embodiment of the invention.

FIG. 6 illustrates a practical example of the apparatus of the invention. The parts denoted by 1L, 1R, 2 to 6, 7L, 7R, 8 and 9 in FIG. 6 are the same as those shown in FIG. 1. A clock signal generator circuit 10 forms a clock signal out of the synchronizing signal separated out in the synchronizing signal separation circuit 6. A low pass filter (LPF) 11 limits the stereoscopic image signal produced from the amplifier 4 to a band. An A/D converter 12 converts the stereoscopic image signal from the LPF 11 to digital form in synchronism with the clock from the clock signal generator circuit 10. A field memory 13 stores the A-D converted stereoscopic image signal. A D/A converter 14 converts the stereoscopic signal read out from the field memory 13 again to analog form in synchronism with a reference signal from a reference signal oscillator 15. A flip-flop (FF) 16 acts as a frequency divider and halves the frequency (60 Hz) of the pulse signal (see FIG. 7(a)). Its output is shown in FIG. 7(b). An address control circuit 17 changes over the writing and reading of the field memory 13 on the basis of the signal from the FF 16 (see FIG. 7(c)). Therefore, the writing-in is carried out in synchronism with the clock signal from the clock signal generator circuit 10, and the reading-out is carried out in synchronism with the reference signal from the reference signal oscillator 15. A selector switch 18 has a movable pole 18c when in contact with a throw 18a to supply the stereoscopic image signal from the amplifier 4 to the television set 5, or when in contact with another throw 18b to supply the readout stereoscopic image signal from the field memory 13 to the television set 5 after it has passed through the D/A converter 14 and the LPF 19 (see FIG. 7(d)). A system control circuit 20 controls the operation of the selector switch 18 in such a manner that when reproducing a stereoscopic picture over the display surface of the television set 5, the movable pole 18c is maintained always in contact with the first throw 18a, or when reproducing an ordinary or flat picture, the movable pole 18c deflects between the two throws 18a and 18b alternately in synchronism with the signal produced from the FF 16.

The operation of the apparatus of FIG. 6 is as follows:

At first, when reproducing a stereoscopic picture over the display surface of the television set 5, the operator will turn a control knob (not shown) to select the stereoscope mode. Responsive to this, the system control circuit 20 brings the movable contact 18c of the selector switch 18 into connection with the first throw 18a. Then, the stereoscopic image signal from the output selection circuit 2 after having been amplified by the amplifier 4 is supplied to the television set 5 as in the prior art. By using the stereoscope spectacles 8 having the light shutter 7L and 7R, the stereoscopic picture can be viewed over the television set 5 as it is supplied with the stereoscopic image signal.

When reproducing a flat picture on the display surface of the television set 5, the control knob will be turned to select the ordinary mode. Responsive to this, the system control circuit 20 controls the reciprocal movement of the pole 18c between the two throws 18a and 18b in synchronism with the signal from the FF 16 in the following manner as shown in FIG. 7(d).

At first, when the output signal of the FF 16 changes to high (H) level, the pole 18c comes to contact with the first throw 18a. Then, the right-camera-eye information signal (R1) from the output selector circuit 2 past the amplifier 4 is written in the field memory 13 in FIG. 7(e), and, at the same time, is supplied through the switch 18 to the television set 5 in FIG. 7(f).

Then, when the output signal of the FF 16 changes to low (L) level, the pole 18c is moved to the second throw 18b. At this time, the right-camera-eye information signal R1′ (=R1) is read out from the field memory 13 and then supplied through the switch 18 to the television set 5 in FIG. 7(f). It is to be noted here that during the time when the right-camera-eye information signal is read out from the field memory 13, the left-camera-eye signal (L1) from the output selector circuit 2 is applied through the amplifier 4 to the field memory 13 in FIG. 7(e) But, since the level of the output signal of the FF 16 is L, no writing-in of this left-camera-eye information signal is carried out.

Then, when the output signal of the FF 16 becomes H again, the selector switch 18 returns to the initial position (18a) Then, when the output signal of the FF 16 becomes L, the selector switch 18 moves to the position (18b). Subsequently, this changing-over operation is repeated. Each time the pole 18c is in contact with the first throw 18a, the ones of the right-camera-eye information signals which are applied from the output selector circuit 2 through the amplifier 4 directly to the selector switch 18, namely, R2, R3, ..., are output in sequence to the television set 5, and each time the pole 18c is in contact with the second throw 18b, the other ones of the right-camera-eye information signals which are routed to the field memory 13, namely, R2', R3', ..., are outputted in sequence to the television set 5.

In conclusion, the television set 5 is supplied with the series of the right-camera-eye information signals in the order of R1, R1', R2, R2', R3, R3', and so on. Thus, the flat pictures are reproduced.

Though the embodiment of the invention has been described as using the right-camera-eye information signal for reproducing the flat picture, the left-camera-eye information signal may otherwise be used to be processed through the field memory 13 to the television set 5 to effect an equivalent result to that described above.

Also, the present invention is applicable not only to a receiver for the stereoscopic image signal as has been described above, but also to the VTR or other recording and reproducing apparatus. Even for this case, the same advantage will be obtained.

What is claimed is:

1. A stereoscopic image signal processing device for processing a stereoscopic image signal in the form of a plurality of time-divisionally multiplexed image information signals, comprising:
    (A) changeover timing detection means receptive to said stereoscopic image signal for detecting the timing of changeover between any two of the time-divisonally multiplexed image information signals of said stereoscopic image signal;
    (B) memory means for memorizing a prescribed image information signal out of said plurality of image information signals;
    (C) control means for controlling the writing-in and reading-out operation of said memory means in accordance with the changeover timing of all said image information signals detected by said changeover timing detection means; and
    (D) output means responsive to the changeover timing of all of said image information signals detected by said changeover timing detection means for providing as an output only said prescribed image information signal.

2. A device according to claim 1, further comprising indicating means having a first output mode in which said stereoscopic image signal is output, and a second output mode in which one of the plurality of image information signals is output, and having a function of selectively indicating either one of said first and second output modes.

3. A device according to claim 2, wherein said output means is arranged to output, when the first output mode is indicated by said indicating means, said stereoscopic image signal, and to output, when the second output mode is indicated, only said one image information signal while changing over said stereoscopic image signal and the output from said memory means alternately in response to the changeover timing of all of said image information signals detected by said changeover timing detection means.

4. A device according to claim 1, wherein said control means is arranged to operate in such a manner that, as said stereoscopic image signal is being input to said device, during the time when said prescribed image information signal is input, said memory means is caused to perform the writing-in operation for said prescribed image information signal, and during the time when image information signals other than said prescribed one are input, the reading-out operation of the image information signal said memory means has memorized is performed.

5. A stereoscopic image signal processing device in which a stereoscopic image signal including two image information signals which are different from each other and alternately arranged at predetermined periods is produced and the stereoscopic image signal thus produced is processed to form an output, comprising:
    (A) image pickup means for shooting an object to be photographed to form a stereoscopic image signal by providing as outputs a first object image signal and second object image signal which are different from each other in prescribed alternate periods;
    (B) changeover timing detection means for detecting the timing of changeover between said first object image signal and said second object image signal in the stereoscopic image signal produced from said image pickup means;
    (C) memory means for memorizing said first object image signal out of said first object image signal and said second object image signal;
    (D) control means for controlling the writing-in and reading-out operation of said memory means in accordance with the timing of changeover between said first and said second object image signals detected by said changeover timing detection means;
    (E) indicating means having a first output mode for providing as an output the stereoscopic image signal and a second output mode for providing as an output only said first object image signal, and having a function of selectively indicating either one of said first and said second output modes; and
    (f) output means responsive to indication of the first output mode in said indicating means for providing as an output the stereoscopic image signal obtained from said image pickup means, and responsive to indication of the second output mode for providing as an output only said first object image signal by alternately changing over the output of said image pickup means and the output of said memory means in response to the timing of changeover between said first and said second object image signals detected by said changeover timing detection means.

6. A device according to claim 5, wherein said control means is arranged to operate in such a manner that, as said image pickup means is producing a stereoscopic image signal, during the time when the first object image signal is the output from said image pickup means, the writing operation of said first object image signal in said memory means is performed, and during the time when the second object image signal is the output from said image pickup means, the reading-out operation of the first object image signal said memory means has memorized is performed.

7. A device according to claim 5, wherein said image pickup means includes a first image pickup element corresponding to the right eye of a human being, and a second image pickup element corresponding to the left eye, said first image pickup element being arranged to produce said first object image signal, and said second image pickup element to produce said second object image signal.

8. A device according to claim 7, further comprising spectacle means for viewing a stereoscopic picture having light shutters operable for passing or blocking light in either of the right or left spectacle portions thereof, and drive means operating in such a manner that, depending on the timing of changeover between said first and said second object image signals detected by said changeover timing detection means, during the time when said first object image signal is the output from said image pickup means, only the right spectacle portion of said stereoscopic picture viewing spectacle means is rendered operable to pass light therethrough, and during the time when said second object image signal is the output from said image pickup means, only the left spectacle portion of said stereoscopic picture viewing spectacle means is rendered operable to pass light therethrough.

* * * * *